Jan. 3, 1967 W. KLOSSIKA 3,296,503
SEMICONDUCTOR STABILIZED MECHANICALLY AND ELECTRICALLY BY A FIRST LAYER OF LACQUER AND A SECOND LAYER OF BORIC OXIDE
Filed Jan. 16, 1963
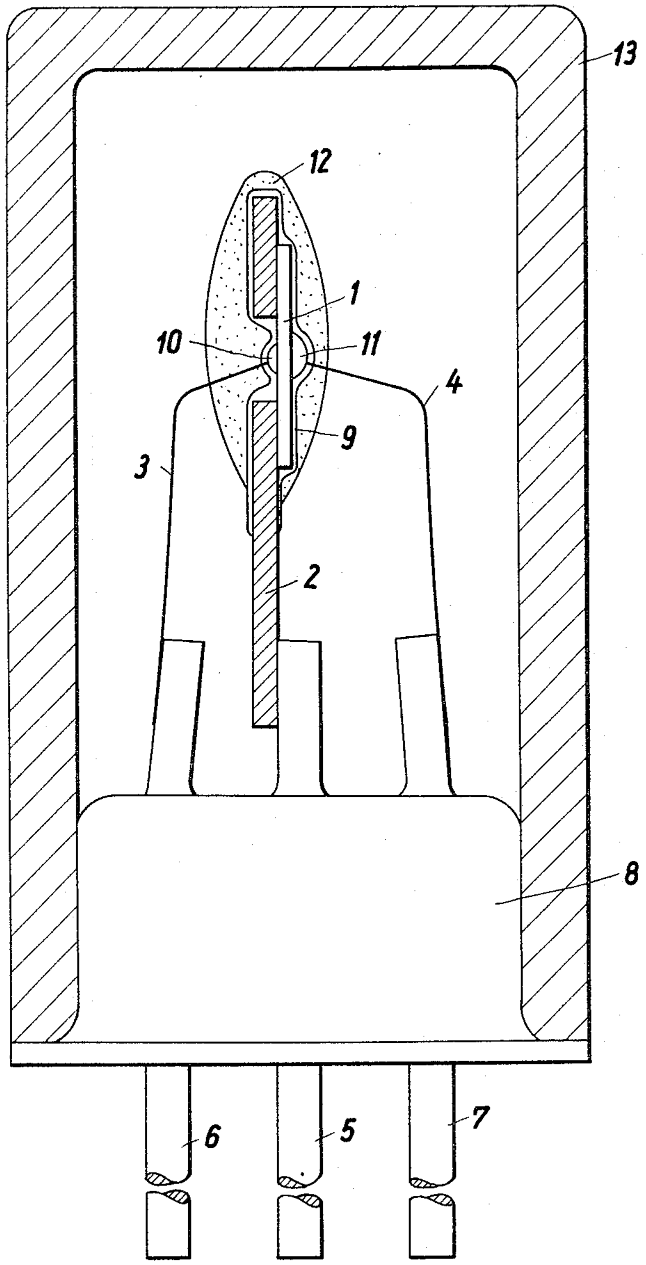
Jnventor:
Walter Klossika
By: Spencer & Kaye
Attorneys United States Patent Office 3,296,503

Patented Jan. 3, 1967

3,296,503

SEMICONDUCTOR STABILIZED MECHANICALLY AND ELECTRICALLY BY A FIRST LAYER OF LACQUER AND A SECOND LAYER OF BORIC OXIDE

Walter Klossika, Heilbronn, Germany, assignor to Telefunken Patentverwertungs-G.m.b.H., Ulm (Danube), Germany Filed Jan. 16, 1963, Ser. No. 251,943
Claims priority, application Germany, Jan. 17, 1962, T 21,431
11 Claims. (Cl. 317—234)

The present invention relates to semiconductors.

More particularly, the present invention relates to a semiconductor arrangement, particularly a transistor or diode, which, for purposes of stabilizing the semiconductor system, is provided with substances which impart mechanical stability to the semiconductor element and surface stability to the surface thereof.

A substance which provides the mechanical stability, i.e., mechanical rigidity or strength, is, for example, lacquer, which is applied to the surface of the semiconductor system. Such a lacquer coating is able, first of all, to protect the semiconductor against mechanical vibrations or shock. This mechanical stabilization is necessary particularly in the case of semiconductor structural elements in which very small alloying pills are but weakly alloyed into the semiconductor body so that they do not adhere too strongly to the semiconductor. In such a case, a lacquer coating can prevent the alloying pill from loosening itself from the semiconductor body.

Besides the mechanical stabilizing of semiconductor structural elements, it is often also necessary to make the semiconductor surface electrically stable, this being done by means of substances serving as surface stabilizing agents. For example, boric oxide is suitable for stabilizing the reverse current as well as the current amplification factor, the boric oxide being applied to the surface of the semiconductor element.

It is difficult, however, to obtain both mechanical stabilization and electrical stabilization of the surface of the semiconductor element of one and the same semiconductor arrangement, one reasons for this being that it is difficult to make a lacquer coating adhere to the boric oxide which stabilizes the semiconductor surface. In practice, the lacquer will adhere to a boric oxide layer only if the thickness of the applied boric oxide layer is too thin to be properly effective as a surface stabilizing agent.

It has been proposed to mix the lacquer which brings about the mechanical stabilization with a substance which stabilizes the surfaces of the semiconductor and to apply this mixture onto the surface of the semiconductor, the object, of course, being to obtain both mechanical and electrical stabilization. The drawback of this, however, is that the admixing of the electrical stabilizing agent with the lacquer substantially reduces the mechanical stabilizing characteristics of the latter. This is particularly so in the case of lacquers such as, for example, silicopon lacquer which, when not admixed with a surface stabilizing agent, imparts mechanical stability within a relatively large temperature range, such as −80° C. to +100° C., but when admixed with a surface stabilizing agent loses its ability to impart mechanical stability at least at very low and very high temperatures, so that when the semiconductor is subjected to shocks or vibration, the alloying pill may loosen itself.

Above all, the admixture of a surface stabilizing agent with the lacquer appears adversely to affect the plasticity of the lacquer, i.e., the ability of the lacquer to retain its shape and form.

It is, therefore, an object of the present invention to overcome the above drawbacks, and with this object in view, the present invention resides in a semiconductor arrangement, such as a transistor or a diode, which comprises a semiconductor element that is at least partially embedded in a substance affording mechanical stability, which mechanical stabilizing substance is at least partially surrounded by a surface stabilizing substance. Experiments have shown that, contrary to initial expectations, the surface stabilizing agent acts through the mechanical stabilizing substance to exert an electrical stabilizing effect on the surface of the semiconductor.

The semiconductor element may have one or more alloying pills which are also embedded within the substance affording mechanical stability.

The advantage of the present invention is that the surface stabilizing agent which is located exteriorly of and applied, for instance, as a coating over the lacquer, produces the desired electrical stability of the surface of the semiconductor without, however, adversely affecting the ability of the lacquer to provide mechanical stabilization. This substantial advantage of embedding the mechanical stabilizing substance within the surface stabilizing substance, over the heretofore customary mixing of these two substances, was wholly unexpected. It was especially surprising to find that, for example, a surface stabilizing boric oxide layer applied onto silicopon lacquer was able to act through the lacquer and to produce the desired surface stability of the semiconductor surface.

Additional objects and advantages of the present invention will become apparent upon consideration of the following description when taken in conjunction with the accompanying drawing in which the single figure is a sectional view of a semiconductor element according to the present invention.

Referring now to the drawing, the same shows an alloyed transistor whose semiconductor body 1 is soldered onto a carrier plate 2. The plate 2 as well as the emitter lead 3 and the collector lead 4 are connected with appropriate electrical lead-ins 5, 6, 7, respectively, passing through the socket 8, the latter carrying a housing 13 to form therewith a vacuum-tight enclosure.

The semiconductor system is covered, firstly, with a lacquer coating 9 consisting, for example, of silicon lacquer and serving to provide the mechanical stability of the arrangement. It has been found that silicopon lacquer is particularly suitable because the same provides the mechanical stability—presumably due to its retention of plasticity—over a wide temperature range. The lacquer coating 9 covers the surface of the semiconductor body 1 as well as the emitter pill 10 and the collector pill 11. A portion of the carrier plate 2 is also covered with the silicon lacquer.

Furthermore, the lacquer coated semiconductor arrangement is embedded in a mass of boric oxide 12 which, despite the lacquer coating 9, produces the desired electrical stability of the semiconductor surface. The semiconductor system is thus stabilized both mechanically and electrically.

It has been found expedient to subject the semiconductor system, after the lacquer and the boric oxide have been applied, to a heat treatment. Such heat treatment is, in general, necessary anyway in order to stabilize the semiconductor system. The heat treatment can be carried out, for example, at a temperature of 80° C. to 150° C. The beneficial effect of the heat is presumably due to the fact that a portion of the surface stabilizing substance applied onto the lacquer diffuses through the lacquer to the surface of the semiconductor.

The name "silicopon lacquer" is a trademark. Such kinds of lacquers are gained by polymerization of epoxy resin with organic silicon connections by which advantageous properties of the epoxy resin and the silicon are combined. If used as outbaked lacquers these lacquers have good temperature behavior, excellent adjacing, to surfaces, a good flexibility and perfect insulation properties. The ratio of the components making the mixture can be changed in a great variety.

To use the mentioned silicon lacquers they are diluted in suitable organic solutions as for example butanol, diacetone alcohol, ethyl glycol acetate or mixtures of these.

Boric oxide ($B_2O_3$) generally is used with a dispersion component as for example silicon oil. Silicon oil is a dimethyl siloxane with the following structure:

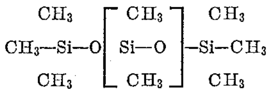

Similar components for the dispersion of $B_2O_3$ would also be each kind of chemical and electrical indifferent oils or soft greases as for example paraffin.

The following examples are illustrative of suitable materials and their thickness, as may be applied to a semiconductor body:

| Example No. | Substance for Imparting Mechanical Stability | Thickness (microns) | Substance for Imparting Surface Stability | Thickness (millimeters) |
|---|---|---|---|---|
| 1 | Silicon lacquer | 10–20 | Boric Oxide ($B_2O_3$) mixed with silicon oil. | 1 |
| 2 | do | 10–20 | Boric Oxide ($B_2O_3$) mixed with paraffin. | 1 |

In will be understood that the various modifications, changes, and adaptions, and the same are intended to be comprehended within the meaning and range of equivalents of the appended claims.

What is claimed is:

1. A semiconductor arrangement comprising, in combination:
   (a) a semiconductor element;
   (b) first means for imparting mechanical stability to said semiconductor element, said first means being a material in which said semiconductor element is at least partially embedded; and
   (c) second means for imparting electrical stability to the surface of said semiconductor element, said second means being a material which at least partially surrounds said first material, said second material being constituted at least in part by boric oxide.

2. A semiconductor arrangement as defined in claim 1 wherein said first material is in the form of a layer applied to said semiconductor element.

3. A semiconductor arrangement as defined in claim 2 wherein said second material is in the form of a coating applied to said first material.

4. A semiconductor arrangement as defined in claim 1 wherein said lacquer is a silicon lacquer.

5. A semiconductor arrangement as defined in claim 1 wherein said boric oxide ($B_2O_3$ is mixed with silicon oil.

6. A semiconductor arrangement as defined in claim 1 wherein said boric oxide ($B_2O_3$) is mixed with paraffin.

7. A semiconductor arrangement as defined in claim 6 wherein the thickness of the lacquer is $10\mu$.

8. A semiconductor arrangement as defined in claim 5 wherein the thickness of the mixture of boric oxide and silicon oil is 1 mm.

9. A semiconductor arrangement as defined in claim 1 wherein said semiconductor element includes a base body and at least one alloying pill, said body and said pill being embedded in said first material.

10. A method of making a semiconductor arrangement, comprising the steps of:
   (a) applying onto a semiconductor element a first layer for imparting mechanical stability to the semiconductor element;
   (b) thereafter applying onto the first layer a second layer for imparting electrical stability to the surface of the semiconductor element, said second material being constituted at least in part by boric oxide; and
   (c) thereafter heat treating the semiconductor element.

11. A method as defined in claim 10 wherein said heat treatment is carried out at a temperature of approximately 80° C.

References Cited by the Examiner

UNITED STATES PATENTS

| | | | |
|---|---|---|---|
| 2,948,050 | 4/1954 | Van Vessen et al. | 29—25.3 |
| 2,937,110 | 6/1960 | John | 117—200 |
| 3,021,460 | 2/1962 | Milam | 317—234 |
| 3,034,079 | 5/1962 | Uhlir | 333—98 |
| 3,115,424 | 12/1963 | Eannarino | 117—213 |
| 3,181,043 | 4/1965 | Cotter | 317—235 |
| 3,206,647 | 9/1965 | Kahn | 317—101 |

JOHN W. HUCKERT, *Primary Examiner.*

M. EDLOW, *Assistant Examiner.*